(12) United States Patent
Liu (10) Patent No.: US 10,885,314 B2
(45) Date of Patent: *Jan. 5, 2021

(54) FACE IDENTIFICATION SYSTEM AND FACE IDENTIFICATION METHOD WITH HIGH SECURITY LEVEL AND LOW POWER CONSUMPTION

(71) Applicant: Kneron Inc., San Diego, CA (US)

(72) Inventor: Chun-Chen Liu, Taipei (TW)

(73) Assignee: Kneron Inc., San Diego, CA (US)

( * ) Notice: Subject to any disclaimer, the term of this patent is extended or adjusted under 35 U.S.C. 154(b) by 605 days.

This patent is subject to a terminal disclaimer.

(21) Appl. No.: 15/876,217

(22) Filed: Jan. 22, 2018

(65) Prior Publication Data

US 2019/0228210 A1 Jul. 25, 2019

(51) Int. Cl.
*G06K 9/00* (2006.01)
*G06K 9/66* (2006.01)

(52) U.S. Cl.
CPC ..... *G06K 9/00288* (2013.01); *G06K 9/00255* (2013.01); *G06K 9/66* (2013.01)

(58) Field of Classification Search
CPC .. G06K 9/00288; G06K 9/66; G06K 9/00255; G06K 9/00201
See application file for complete search history.

(56) References Cited

U.S. PATENT DOCUMENTS

| | | | | |
|---|---|---|---|---|
| 2003/0209893 | A1* | 11/2003 | Breed | B60N 2/0248 280/735 |
| 2006/0036559 | A1 | 2/2006 | Nugent | |
| 2017/0017834 | A1* | 1/2017 | Sabitov | G01J 3/4535 |

FOREIGN PATENT DOCUMENTS

| | | |
|---|---|---|
| CN | 104715254 A | 6/2015 |
| CN | 105809113 A | 7/2016 |
| CN | 205375507 U | 7/2016 |
| CN | 205621018 U | 10/2016 |
| CN | 107480575 A | 12/2017 |
| CN | 107578014 A | 1/2018 |
| CN | 107609383 A | 1/2018 |
| TW | 201719576 A | 6/2017 |

* cited by examiner

*Primary Examiner* — Chan S Park
*Assistant Examiner* — Elisa M Rice
(74) *Attorney, Agent, or Firm* — Winston Hsu (57) ABSTRACT

A face identification system includes a transmitter, a receiver, a database, an artificial intelligence chip, and a main processor. The transmitter is used for emitting at least one first light signal to an object. The receiver is used for receiving at least one second light signal reflected by the object. The database is used for saving training data. The artificial intelligence chip is coupled to the transmitter, the receiver, and the database for identifying a face image from the object according to the at least one second light signal and the training data. The main processor is coupled to the artificial intelligence chip for receiving a face identification signal generated from the artificial intelligence chip.

19 Claims, 5 Drawing Sheets

FACE IDENTIFICATION SYSTEM AND FACE IDENTIFICATION METHOD WITH HIGH SECURITY LEVEL AND LOW POWER CONSUMPTION

BACKGROUND OF THE INVENTION

1. Field of the Invention

The present invention illustrates a face identification system and a face identification method, and more particularly, a face identification system and a face identification method with a high security level and low power consumption by using an artificial intelligence chip non-embedded in a main processor.

2. Description of the Prior Art

The idea of artificial neural networks has existed for a long time. Nevertheless, limited computation ability of hardware has been an obstacle to related researches. Over the last decade, there are significant progresses in computation capabilities of processors and algorithms of machine learning. Not until recently did an artificial neural network that can generate reliable judgments become possible. Gradually, artificial neural networks are experimented in many fields such as autonomous vehicles, image recognitions, natural language understanding applications, and data mining applications.

Neurons are the basic computation units in a brain. Each neuron receives input signals from its dendrites and produces output signals along its single axon (i.e., usually provided to other neurons as input signals). The typical operation of an artificial neuron can be modeled as:

$$y = f\left(\sum_i w_i x_i + b\right)$$

Here, $x_i$ represents an input signal of i-th source, y represents an output signal. Each dendrite multiplies a weighting $w_i$ to its corresponding input signal $x_i$ for simulating the strength of influence of one neuron on another. b represents a bias contributed by the artificial neuron itself. $f(\bullet)$ represents as a specific transfer function, which is generally implemented as a sigmoid function, a hyperbolic tangent function, or a rectified linear function in a practical computation.

For an artificial neural network, a multi-layer structure is generally introduced for adjusting parameters of each layer to generate an optimal output with a minimal error offset. Generally, the multi-layer structure includes an input layer, an output layer, and several hidden layers. The output layer and the hidden layers can be convolutional layers or fully-connected layers with each artificial neuron satisfying aforementioned equation model. Since each hidden layer and the output layer can perform computation by non-linearly combining (k−1)th layer's output signals as a kth layer's input signals to generate kth layer's output signals, when a layer index k is large, high computation complexity is unavoidable because of recursively executing all artificial neurons as a mesh structure. Therefore, a portable device (i.e., such as a smartphone) with limited computational capability is required to establish a wireless or wired link to an external sever for assisting artificial neuron operations and accessing data from the artificial neural network. Alternatively, the portable device can use a main processor for performing functionalities of artificial neural networks since the main processor can provide high computational capability.

However, using the main processor or the external server for performing functionalities of the artificial neural networks has a risk of data leakage. For example, when an artificial intelligence (AI) face detection and recognition function is performed by using the external server or the main processor, since the external server or the main processor can be linked to any risky internet, a data stealer or a hacker can use illegal methods for stealing or extracting personal information through the internet. Therefore, conventional AI face detection and recognition function of the portable device are lack of privacy security, and may consume additional power when some unnecessary processes or programs are continuously executed.

SUMMARY OF THE INVENTION

In an embodiment of the present invention, a face identification system is disclosed. The face identification system includes a transmitter, a receiver, a database, an artificial intelligence chip, and a main processor. The transmitter is configured to emit at least one first light signal to an object. The receiver is configured to receive at least one second light signal reflected by the object. The database is configured to save training data. The artificial intelligence chip is coupled to the transmitter, the receiver, and the database and configured to identify a face image from the object according to the at least one second light signal and the training data. The main processor is coupled to the artificial intelligence chip and configured to receive a face identification signal generated from the artificial intelligence chip.

In another embodiment of the present invention, a face identification method is disclosed. The face identification method includes emitting at least one first light signal to an object, receiving at least one second light signal reflected by the object, performing a face detection function by an artificial intelligence chip for detecting a face image from the object according to the at least one second light signal, and disabling a two-dimensional face recognition function and a three-dimensional face recognition function of the artificial intelligence chip when the face image from the object is undetected.

In another embodiment of the present invention, a face identification method is disclosed. The face identification method includes emitting at least one first light signal to an object, receiving at least one second light signal reflected by the object, performing a face detection function by an artificial intelligence chip for detecting a face image from the object according to the at least one second light signal, performing a two-dimensional face recognition function and a three-dimensional face recognition function of the artificial intelligence chip after the face image from the object is detected, and generating a face identification signal by the artificial intelligence chip after the two-dimensional face recognition function and the three-dimensional face recognition function are performed.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
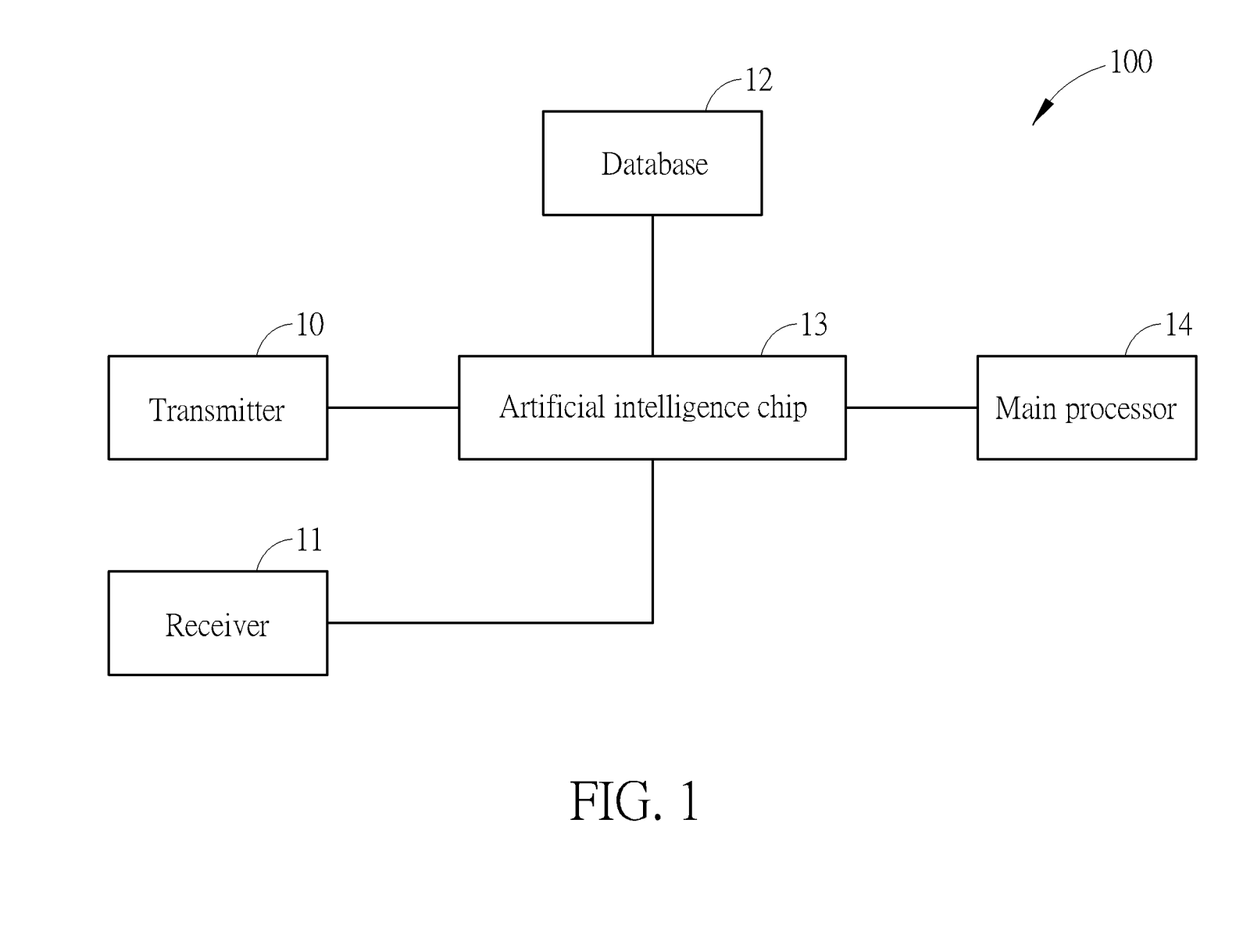
FIG. 1 is a block diagram of a face identification system according to the embodiment of the present invention.

FIG. 1 is a block diagram of a face identification system 100 according to the embodiment of the present invention. The face identification system 100 can be an artificial intelligence based face identification system with high recognition accuracy. The face identification system 100 can be applied to any portable device, a personal computer, and a smartphone capable of sensing optical signals. The face identification system 100 includes a transmitter 10, a receiver 11, a database 12, an artificial intelligence chip 13, and a main processor 14. The transmitter 10 is used for emitting at least one first light signal to an object. The transmitter 10 can include dual camera light emitting lenses for emitting two first light signals to the object with different angles of incidence. Further, the transmitter 10 can include a two-dimensional light emitting device for emitting a two-dimensional (2D) light signal to the object, and a three-dimensional structured light emitting device for emitting a three-dimensional (3D) structured light signal to the object.

The transmitter 10 can only include a single camera light emitting lens. Any reasonable hardware modification falls into the scope of the present invention. The receiver 11 is used for receiving at least one second light signal reflected by the object. For example, after the transmitter 10 emits a plurality of 3D structured light signals, a curved surface of the object can reflect a part of the 3D structured light signals to generate some second light signals bearing 3D object information. A flat surface of the object can reflect another part of the 3D structured light signals to generate some second light signals bearing 2D object information. The receiver 11 can be any device capable of sensing optical signals. For example, the receiver 11 can include a charge-coupled device (CCD) or a complementary metal-oxide-semiconductor (CMOS) for sensing optical signals. In other words, by using paired transmitter 10 and the receiver 11, the at least one second light signal can be received by the receiver 11. The at least one second light signal includes 2D image information of the object and 3D image information of the object. The face identification system 100 can also convert the 2D image information to the 3D image information as a bitmap information matrix. The database 12 is used for saving training data. The training data can include information of a plurality of face images corresponding to different users. As mentioned previously, the face identification system 100 can be an artificial intelligence based face identification system capable of detecting a face image from the object. Therefore, the face identification system 100 can check the likelihood of the face image detected from the object and a face image stored in the database 12 belonging to the same person. The artificial intelligence chip 13 is coupled to the transmitter 10, the receiver 11, and the database 12 for identifying the face image from the object according to the at least one second light signal and the training data. The artificial intelligence chip 13 can be a neural processing unit (NPU), a deep learning accelerator (DLA), or any processing unit capable of performing artificial neuron networks. The main processor 14 is coupled to the artificial intelligence chip 13 for receiving a face identification signal generated from the artificial intelligence chip 13. The main processor 14 can be a central processing unit (CPU), a graphics processing unit (GPU), or any programmable logical device. After the main processor 14 receives the face identification signal, the main processor 14 can generate a text signal, an interface, or an image for informing an identification result to the user. For example, the face identification signal generated by the artificial intelligence chip 13 can include a first decision signal or a second decision signal. The first decision signal is generated when the face image is successfully detected and recognized from the object. The second decision signal is generated when the face image is undetected or unrecognized from the object.

Figure 2:
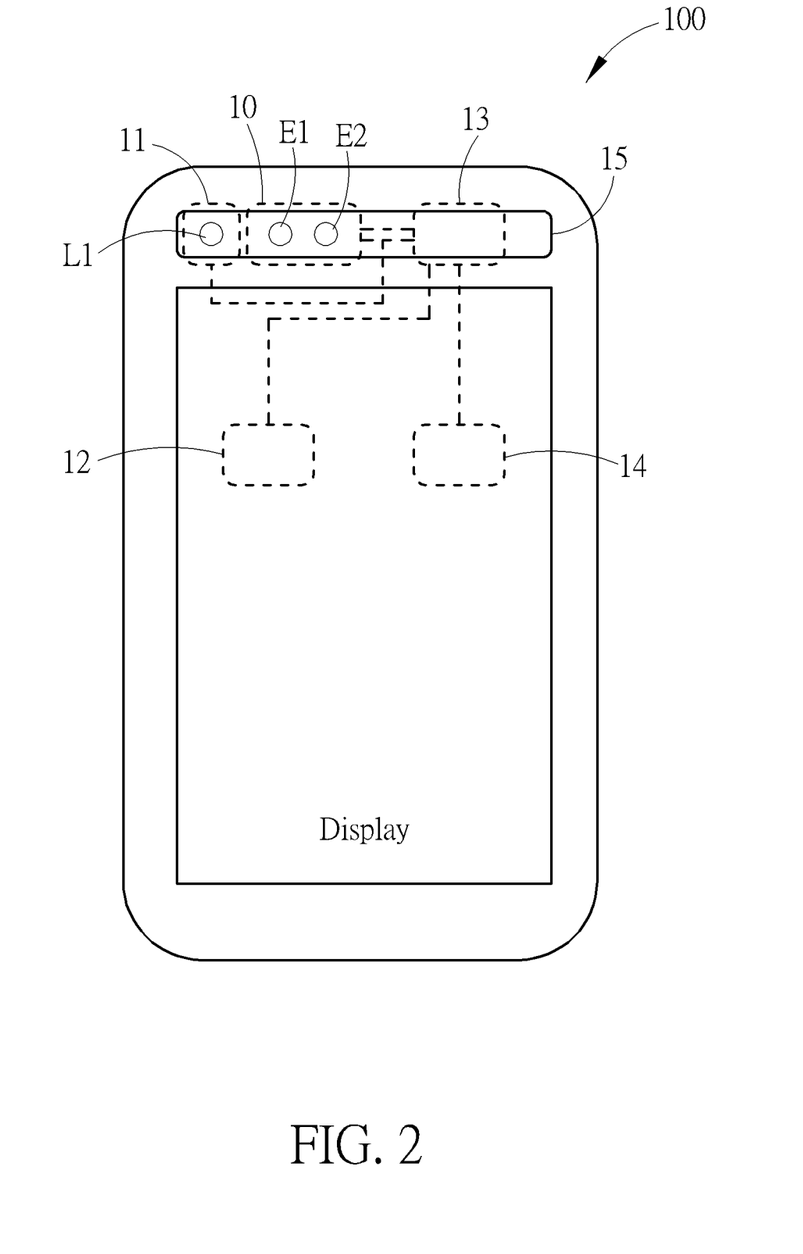
FIG. 2 is an illustration of the face identification system in FIG. 1.

FIG. 2 is an illustration of the face identification system 100. As previously mentioned, the face identification system 100 can be applied to a smartphone. As shown in FIG. 2, the transmitter 10, the receiver 11, and the artificial intelligence chip 13 can be disposed on an upper bar region 15 of the smart phone. The transmitter 10 can include the 2D light emitting device (i.e., a single camera) E1 and the 3D structured light emitting device E2. However, in another embodiment, components E1 and E2 can be paired as the dual camera light emitting lenses. The receiver 11 can include an optical sensor L1 with the CCD or CMOS. Further, the artificial intelligence chip 13 can perform a face detection function and at least one of a 2D face recognition function and a 3D face recognition function when the face image is successfully detected. The artificial intelligence chip 13 uses a first driving power for performing the face detection function. The artificial intelligence chip 13 uses a second driving power for performing the 2D face recognition function when the face image is successfully detected. Then, the artificial intelligence chip 13 uses a third driving power for performing the 3D face recognition function after the 2D face recognition function is performed. The first driving power is smaller than the second driving power. The second driving power is smaller than the third driving power. In the face identification system 100, the face detection function is a resident program (i.e., always turned on) since the face identification system 100 continuously finds possible face contours from the object. However, the 2D face recognition function and the 3D face recognition function are non-resident programs (i.e., conditionally turned on) since they are enabled when the face image is successfully detected. Once the face image from the object is undetected, the 2D face recognition function and the 3D face recognition function are disabled, regardless of their previous operation states. By doing so, since the face detection function, the 2D face recognition function, and the 3D face recognition function are adaptively activated instead of being permanently turned on, the face identification system 100 can avoid additional power consumption and thus provide long-term operations.

Figure 3:
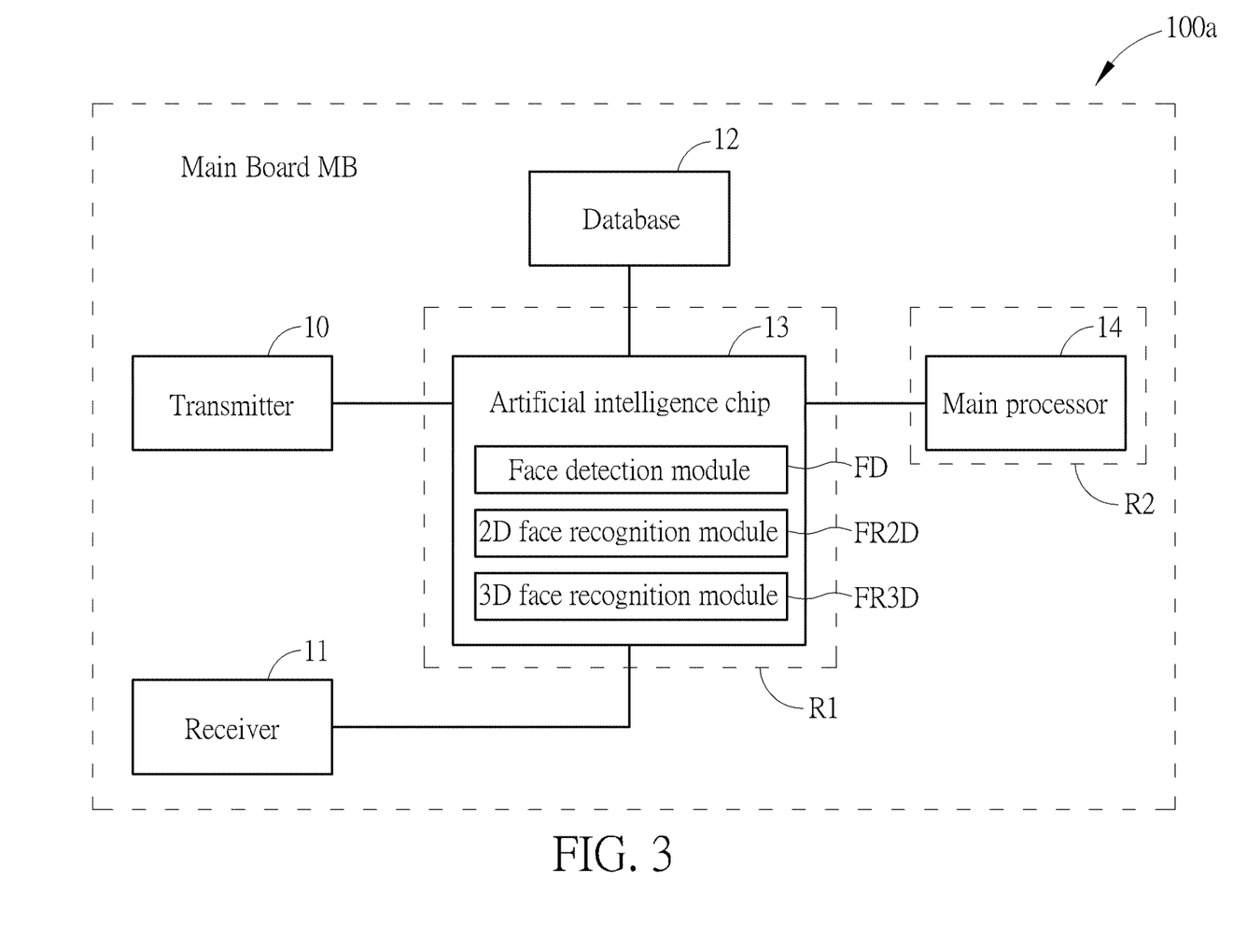
FIG. 3 is an illustration of first allocations of a face detection module, a two-dimensional face recognition module, and a three-dimensional face recognition module in the face identification system in FIG. 1.

FIG. 3 is an illustration of first allocations of a face detection module FD, a 2D face recognition module FR2D, and a 3D face recognition module FR3D in the face identification system 100. To avoid ambiguity, the face identification system in FIG. 3 is denoted as a face identification system 100a hereafter. In the face identification system 100a, the artificial intelligence chip 13 includes the face detection module FD, the 2D face recognition module FR2D, and the 3D face recognition module FR3D. The face detection module FD is used for detecting the face image from the object according to the at least one second light signal. The 2D face recognition module FR2D is used for recognizing the face image as of a 2D user identifier according to the at least one second light signal and the training data. The 3D face recognition module FR3D is used for recognizing the face image as of a 3D user identifier according to the at least one second light signal and the training data. Here, the 2D/3D user identifier (UID) can be any user information or user indicator, such as a user name or a user serial number. Particularly, recognition accuracy of the 3D user identifier is greater than recognition accuracy of the 2D user identifier. For example, the recognition accuracy of the 2D user identifier is substantially equal to 98%~99%. The recognition accuracy of the 3D user identifier is substantially equal to 99.999999%. As previously mentioned, to avoid additional power consumption, after the face detection module FD successfully detects the face image from the object, the 2D face recognition module FR2D is enabled for recognizing the face image as of the 2D user identifier. Then, the 3D face recognition module FR3D is enabled for recognizing the face image as of the 3D user identifier. On the contrary, when the face detection module FD fails to detect the face image from the object, the 2D face recognition module FR2D and the 3D face recognition module FR3D are disabled for reducing power consumption. Additionally, in the face identification system 100a, the artificial intelligence chip 13 is disposed within a first region R1 of a main board MB. The main processor 14 is disposed within a second region R2 of the main board MB. The first region R1 and the second region R2 are non-overlapped. In other words, the artificial intelligence chip 13 is not embedded in the main processor 14. Further, an encoder and a decoder can be introduced to a data link between the artificial intelligence chip 13 and the main processor 14 for avoiding data leakage and enhancing privacy security.

In the face identification system 100a, high privacy security can be provided by using independent artificial intelligence chip 13, as illustrated below. Since the main processor 14 may drive a wireless transceiver for accessing data from a public internet, when the artificial intelligence chip 13 is embedded in the main processor 14, it is easy for a data stealer or a hacker to use illegal methods for directly stealing or extracting personal information of the artificial intelligence chip 13 from the main processor 14 through the internet. To avoid risk of data leakage, in the face identification system 100a, the artificial intelligence chip 13 can perform all operations of face identification, such as the face detection function, the 2D face recognition function, and the 3D face recognition function. Instead of establishing a wireless link to the internet, the artificial intelligence chip 13 can encrypt a face identification signal (i.e., an identification result) to the main processor 14. Thus, for the data stealer or the hacker, it is difficult to directly steal or extract personal information from the encrypted data link by controlling the main processor 14 through the internet. Thus, by using non-embedded artificial intelligence chip 13, the face identification system 100a can provide high privacy security in conjunction with low power consumption.

Figure 4:
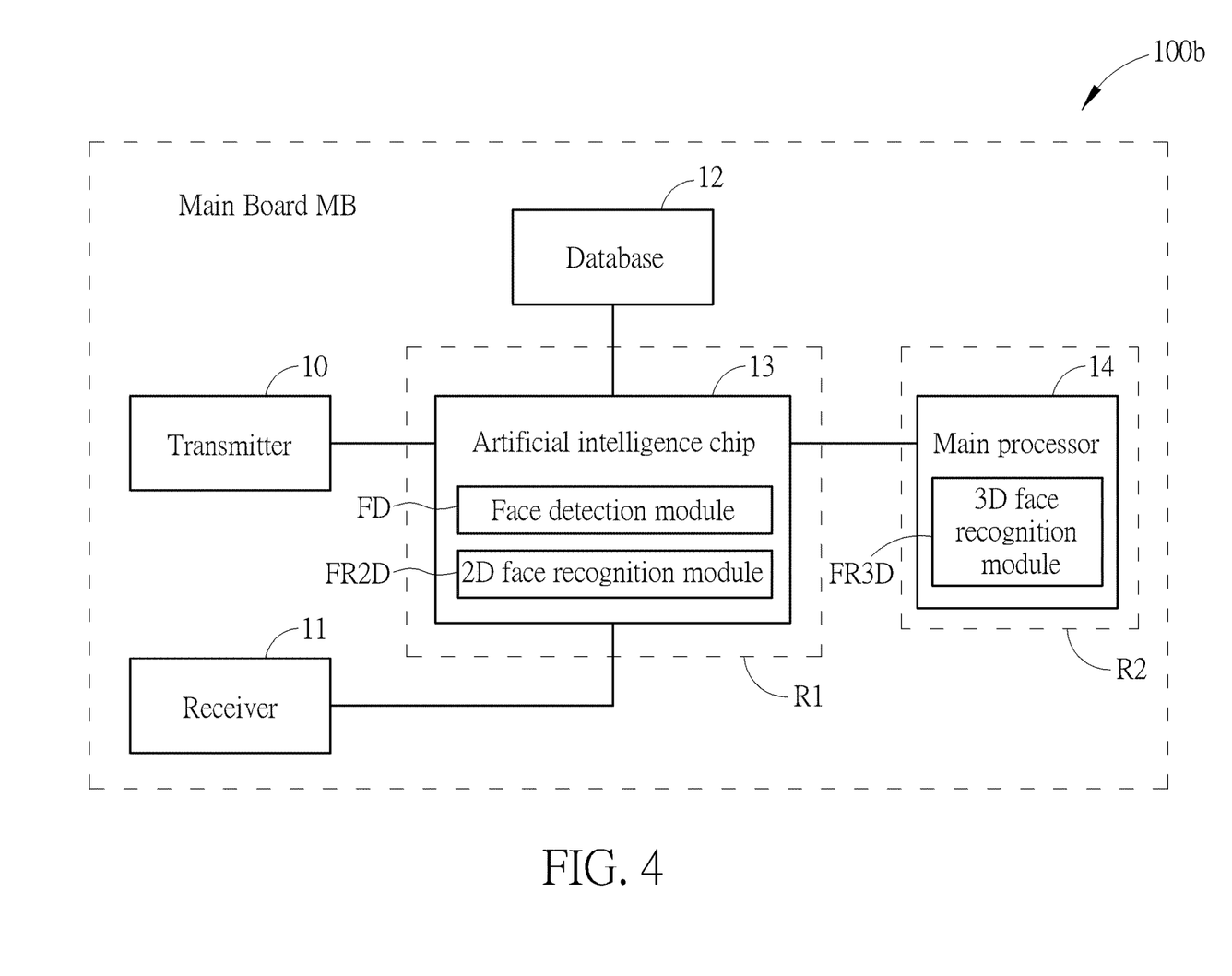
FIG. 4 is an illustration of second allocations of the face detection module, the two-dimensional face recognition module, and the three-dimensional face recognition module in the face identification system in FIG. 1.

FIG. 4 is an illustration of second allocations of the face detection module FD, the 2D face recognition module FR2D, and the 3D face recognition module FR3D in the face identification system 100. For avoid ambiguity, the face identification system in FIG. 4 is denoted as face identification system 100b hereafter. In the face identification system 100b, the artificial intelligence chip 13 includes the face detection module FD and the 2D face recognition module FR2D. Specifically, the 3D face recognition module FR3D is embedded in the main processor 14. Similarly, the face detection module FD is used for detecting the face image from the object according to the at least one second light signal. The 2D face recognition module FR2D is used for recognizing the face image as of a 2D user identifier according to the at least one second light signal and the training data. The 3D face recognition module FR3D is used for recognizing the face image as of a 3D user identifier according to the at least one second light signal and the training data. After the face detection module FD successfully detects the face image from the object, the 2D face recognition module FR2D is enabled for recognizing the face image as of the 2D user identifier. Then, the 3D face recognition module FR3D is enabled for recognizing the face image as of the 3D user identifier. On the contrary, when the face detection module FD fails to detect the face image from the object, the 2D face recognition module FR2D and the 3D face recognition module FR3D are disabled for reducing power consumption.

In other words, in the face identification system 100b, the main processor 14 can assist in performing at least one function of the face identification. For example, the main processor 14 can assist in performing the 3D face recognition function for balancing operation loads between the artificial intelligence chip 13 and the main processor 14. Any reasonable hardware modification falls into the scope of the present invention. For example, the main processor 14 can also be designed to assist in performing the 3D face recognition function for balancing operation loads between the artificial intelligence chip 13 and the main processor 14. Further, in the face identification system 100b, the artificial intelligence chip 13 is disposed within a first region R1 of a main board MB. The main processor 14 is disposed within a second region R2 of the main board MB. The first region R1 and the second region R2 are non-overlapped. Therefore, the face identification system 100b can also provide satisfactory privacy security because the artificial intelligence chip 13 is not embedded in the main processor 14.

Figure 5:
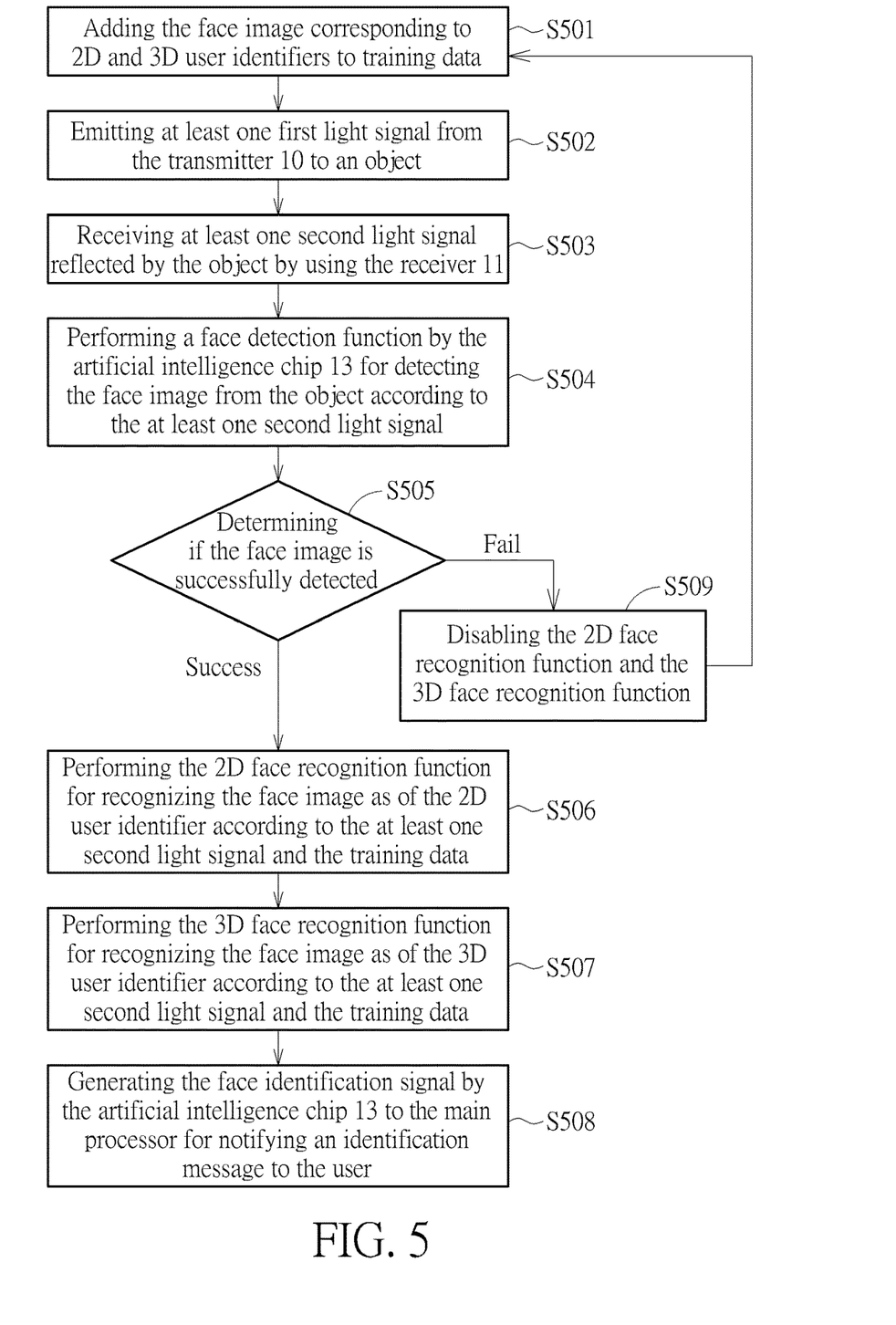
FIG. 5 is a flow chart of a face identification method for the face identification system in FIG. 1.

FIG. 5 is a flow chart of a face identification method for the face identification system 100. The face identification method includes step S501 to step S509. Any reasonable step modification falls into the scope of the present invention. Step S501 to step S509 are illustrated below.

step S501: adding the face image corresponding to 2D and 3D user identifiers to training data;

step S502: emitting at least one first light signal from the transmitter 10 to an object;

step S503: receiving at least one second light signal reflected by the object by using the receiver 11;

step S504: performing a face detection function by the artificial intelligence chip 13 for detecting the face image from the object according to the at least one second light signal;

step S505: determining if the face image is successfully detected; if the face image is successfully detected, executing step S506; if the face image is undetected, executing step S509;

step S506: performing the 2D face recognition function for recognizing the face image as of the 2D user identifier according to the at least one second light signal and the training data;

step S507: performing the 3D face recognition function for recognizing the face image as of the 3D user identifier according to the at least one second light signal and the training data;

step S508: generating the face identification signal by the artificial intelligence chip 13 to the main processor for notifying an identification message to the user;

step S509: disabling the 2D face recognition function and the 3D face recognition function and returning to step S501 for preparing to detect the face image at the next moment.

Step S501 to step S509 are illustrated in aforementioned embodiments. Thus, illustrations of step S501 to S509 are omitted here. In the face identification system 100, since the recognition accuracy of the 3D face recognition function (i.e., 99.999999%) is greater than the 2D face recognition (i.e., 98%-99%), a preferred embodiment is provided by introducing step S506 and step S507 for increasing the recognition accuracy. However, the present invention is not limited to using step S501 to S509 for identifying the face image. For example, when a smartphone is lack of hardware components of the dual camera light emitting lenses or the 3D structured light emitting device, the smartphone can only perform 2D face recognition function for recognizing the face image with lower recognition accuracy. In other words, when the smartphone is only compatible with 2D images, step S507 can be ignored. Therefore, by appropriately adjusting the face identification method, the face identification system 100 can be applied to any type of smartphone with the artificial intelligence chip.

To sum up, the present invention discloses a face identification system and a face identification method. The face identification system uses an artificial intelligence chip for processing a face detection function, a 2D face recognition function, and a 3D face recognition function. Particularly, the artificial intelligence chip and a main processor are disposed on different regions in a main board and can be communicated through an encrypted data link. Thus, the face identification system can avoid data leakage and enhance privacy security. Further, the 2D face recognition function and the 3D face recognition function are non-resident programs. Since the 2D face recognition function and 3D face recognition function are adaptively activated instead of being permanently turned on, the face identification system can also avoid additional power consumption and thus provide long-term operations.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A face identification system comprising:
a transmitter configured to emit at least one first light signal to an object;
a receiver configured to receive at least one second light signal reflected by the object;
a database configured to save training data;
an artificial intelligence chip coupled to the transmitter, the receiver, and the database and configured to identify a face image from the object according to the at least one second light signal and the training data; and
a main processor coupled to the artificial intelligence chip and configured to receive a face identification signal generated from the artificial intelligence chip;

wherein the artificial intelligence chip performs a face detection function and at least one of a two-dimensional face recognition function and a three-dimensional face recognition function when the face image is successfully detected, the artificial intelligence chip uses a first driving power for performing the face detection function, the artificial intelligence chip uses a second driving power for performing the two-dimensional face recognition function when the face image is successfully detected, the artificial intelligence chip uses a third driving power for performing the three-dimensional face recognition function after the two-dimensional face recognition function is performed.

2. The system of claim 1, wherein the transmitter comprises:
dual camera light emitting lenses configured to emit two first light signals to the object with different angles of incidence.

3. The system of claim 1, wherein the transmitter comprises:
a three-dimensional structured light emitting device configured to emit a three-dimensional structured light signal to the object; and
a two-dimensional light emitting device configured to emit a two-dimensional light signal to the object.

4. The system of claim 3, wherein the at least one second light signal received by the receiver comprises two-dimensional image information of the object and three-dimensional image information of the object.

5. The system of claim 4, wherein the three-dimensional image information of the object is a bitmap information matrix of the object.

6. The system of claim 3, wherein the artificial intelligence chip comprises:
a face detection module configured to detect the face image from the object according to the at least one second light signal;
a two-dimensional face recognition module configured to recognize the face image as of a two-dimensional user identifier according to the at least one second light signal and the training data; and
a three-dimensional face recognition module configured to recognize the face image as of a three-dimensional user identifier according to the at least one second light signal and the training data.

7. The system of claim 6, wherein after the face detection module successfully detects the face image from the object, the two-dimensional face recognition module is enabled for recognizing the face image as of the two-dimensional user identifier, and after the two-dimensional user identifier is successfully generated, the three-dimensional face recognition module is enabled for recognizing the face image as of the three-dimensional user identifier.

8. The system of claim 6, wherein when the face detection module fails to detect the face image from the object, the two-dimensional face recognition module and the three-dimensional face recognition module are disabled.

9. The system of claim 1, wherein the artificial intelligence chip comprises:
a face detection module configured to detect the face image from the object according to the at least one second light signal; and
a two-dimensional face recognition module configured to recognize the face image as of a two-dimensional user identifier according to the at least one second light signal and the training data; and
wherein the main processor comprises:

a three-dimensional face recognition module configured to recognize the face image as of a three-dimensional user identifier according to the at least one second light signal and the training data.

10. The system of claim 9, wherein after the face detection module successfully detects the face image from the object, the two-dimensional face recognition module is enabled for recognizing the face image as of the two-dimensional user identifier, and the three-dimensional face recognition module is enabled for recognizing the face image as of the three-dimensional user identifier after the two-dimensional user identifier is successfully generated.

11. The system of claim 9, wherein when the face detection module fails to detect the face image from the object, the two-dimensional face recognition module and the three-dimensional face recognition module are disabled.

12. The system of claim 1, wherein the face identification signal generated from the artificial intelligence chip comprises a first decision signal or a second decision signal, the first decision signal is generated when the face image is successfully detected and recognized from the object, and the second decision signal is generated when the face image is undetected or unrecognized from the object.

13. The system of claim 1, wherein the first driving power is smaller than the second driving power, and the second driving power is smaller than the third driving power.

14. The system of claim 1, wherein the artificial intelligence chip is disposed within a first region of a main board, the main processor is disposed within a second region of the main board, and the first region and the second region are non-overlapped.

15. A face identification method comprising:
emitting at least one first light signal to an object;
receiving at least one second light signal reflected by the object;
performing a face detection function by an artificial intelligence chip for detecting a face image from the object according to the at least one second light signal; and
disabling a two-dimensional face recognition function and a three-dimensional face recognition function of the artificial intelligence chip when the face image from the object is undetected;
wherein the artificial intelligence chip performs the face detection function and at least one of the two-dimensional face recognition function and the three-dimensional face recognition function when the face image is successfully detected, the artificial intelligence chip uses a first driving power for performing the face detection function, the artificial intelligence chip uses a second driving power for performing the two-dimensional face recognition function when the face image is successfully detected, the artificial intelligence chip uses a third driving power for performing the three-dimensional face recognition function after the two-dimensional face recognition function is performed.

16. A face identification method comprising:
emitting at least one first light signal to an object;
receiving at least one second light signal reflected by the object;
performing a face detection function by an artificial intelligence chip for detecting a face image from the object according to the at least one second light signal;
performing a two-dimensional face recognition function and a three-dimensional face recognition function of the artificial intelligence chip after the face image from the object is detected; and
generating a face identification signal by the artificial intelligence chip after the two-dimensional face recognition function and the three-dimensional face recognition function are performed;
wherein the artificial intelligence chip performs the face detection function and at least one of the two-dimensional face recognition function and the three-dimensional face recognition function when the face image is successfully detected, the artificial intelligence chip uses a first driving power for performing the face detection function, the artificial intelligence chip uses a second driving power for performing the two-dimensional face recognition function when the face image is successfully detected, the artificial intelligence chip uses a third driving power for performing the three-dimensional face recognition function after the two-dimensional face recognition function is performed.

17. The method of claim 16, wherein the face identification signal generated by the artificial intelligence chip comprises a first decision signal or a second decision signal, the first decision signal is generated when the face image is successfully recognized from the object, and the second decision signal is generated when the face image is unrecognized from the object.

18. The method of claim 16, wherein the face detection function is a resident program, and the two-dimensional face recognition function and the three-dimensional face recognition function are non-resident programs.

19. The method of claim 16, further comprising:
adding the face image corresponding to a two-dimensional user identifier and a three-dimensional user identifier to training data;
recognizing the face image as of the two-dimensional user identifier according to the at least one second light signal and the training data; and
recognizing the face image as of the three-dimensional user identifier according to the at least one second light signal and the training data after the two-dimensional user identifier is successfully recognized;
wherein recognition accuracy of the three-dimensional user identifier is greater than recognition accuracy of the two-dimensional user identifier.

* * * * *